US010816107B2

(12) United States Patent
Anderson

(10) Patent No.: US 10,816,107 B2
(45) Date of Patent: Oct. 27, 2020

(54) CLAMP FOR CIRCULAR OBJECTS

(71) Applicant: ERICO INTERNATIONAL CORPORATION, Solon, OH (US)

(72) Inventor: Scott Ernest Anderson, Garrettsville, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 16/548,485

(22) Filed: Aug. 22, 2019

(65) Prior Publication Data

US 2019/0376624 A1     Dec. 12, 2019

Related U.S. Application Data

(63) Continuation of application No. 15/986,338, filed on May 22, 2018, now Pat. No. 10,393,290.

(60) Provisional application No. 62/509,505, filed on May 22, 2017.

(51) Int. Cl.
*F16L 3/10* (2006.01)
*F16B 2/10* (2006.01)

(52) U.S. Cl.
CPC .............. *F16L 3/1091* (2013.01); *F16B 2/10* (2013.01); *F16L 3/1016* (2013.01); *F16L 3/1075* (2013.01)

(58) Field of Classification Search
CPC .......... F16L 3/1091; F16L 3/1075; F16B 2/10
USPC ... 248/49, 62, 67.7, 74.4, 74.5, 643, 229.15, 248/229.25, 228.6, 230.6, 231.71
See application file for complete search history.

(56) References Cited

U.S. PATENT DOCUMENTS

| 622,739 A | 4/1899 | Wahlert |
| 1,373,235 A | 3/1921 | Giberson |
| 1,776,343 A | 9/1930 | Allyn |
| 2,550,001 A * | 4/1951 | Button ................. F16L 3/1091 248/49 |
| 3,227,406 A | 1/1966 | Shelton et al. |
| 3,251,615 A | 5/1966 | Short, III |
| 3,788,677 A * | 1/1974 | Stade ..................... F16L 23/08 285/367 |
| 4,373,235 A | 2/1983 | Korgaonkar |
| D298,802 S * | 12/1988 | Tekirian ........................ D8/396 |
| 4,915,305 A | 4/1990 | O'Brien et al. |
| 5,727,762 A * | 3/1998 | Cosentino ............ F16L 3/1016 248/154 |
| 6,626,466 B1 | 9/2003 | Dole |
| 7,090,259 B2 | 8/2006 | Dole |
| 7,140,579 B2 | 11/2006 | Kirschner |
| 7,490,388 B2 | 2/2009 | Van Walraven |
| 8,047,476 B2 | 11/2011 | Van Walraven |

(Continued)

OTHER PUBLICATIONS

Eaton; Pipe Clamps; catalog; 36 pages.
(Continued)

*Primary Examiner* — Muhammad Ijaz
(74) *Attorney, Agent, or Firm* — Quarles & Brady LLP

(57) ABSTRACT

A clamp can be configured to secure a circular object and can include a first clamp member and a second clamp member. The first clamp member can include a first clamp portion and the second clamp member can include a second clamp portion. The first clamp portion and the second clamp portion can be configured to receive the circular object therebetween, and to secure the circular object within the clamp with the second clamp member nested with the first clamp member.

17 Claims, 8 Drawing Sheets

(56) References Cited

U.S. PATENT DOCUMENTS

| | | | |
|---|---|---|---|
| 8,100,368 B2 | 1/2012 | Jackson et al. | |
| 8,276,854 B2 | 10/2012 | Mominee et al. | |
| 8,313,065 B2 | 11/2012 | Birch | |
| 8,464,987 B1 | 6/2013 | Decesare et al. | |
| D692,294 S * | 10/2013 | Koeniger | D8/396 |
| 8,573,543 B2 | 11/2013 | Mominee et al. | |
| 8,596,589 B2 | 12/2013 | Hennon | |
| 8,746,632 B2 * | 6/2014 | Walraven | F16L 5/00 248/62 |
| 9,010,697 B1 | 4/2015 | Kirschner | |
| 9,033,289 B2 | 5/2015 | Hennon | |
| 9,038,968 B2 | 5/2015 | Hennon | |
| 9,039,046 B2 | 5/2015 | Beagen, Jr. | |
| 9,168,585 B2 | 10/2015 | Schell et al. | |
| 9,194,516 B2 | 11/2015 | Beagen, Jr. | |
| 9,297,484 B2 | 3/2016 | Beagen, Jr. | |
| 9,500,307 B2 | 11/2016 | Beagen, Jr. | |
| 9,518,684 B2 | 12/2016 | Juzak et al. | |
| 9,534,715 B2 | 1/2017 | Beagen, Jr. | |
| 9,631,746 B2 | 4/2017 | Beagen, Jr. | |
| 2007/0131823 A1 * | 6/2007 | Mominee | F16L 3/1016 248/62 |
| 2008/0246279 A1 | 10/2008 | Van Walraven | |
| 2008/0277535 A1 | 11/2008 | Kirschner | |
| 2014/0259397 A1 * | 9/2014 | McReynolds | A47C 20/041 5/412 |
| 2015/0375298 A1 | 12/2015 | Schell et al. | |
| 2017/0016560 A1 | 1/2017 | Beagen, Jr. | |
| 2017/0074433 A1 | 3/2017 | Beagen, Jr. | |
| 2017/0184233 A1 | 6/2017 | Beagen, Jr. | |
| 2018/0335165 A1 * | 11/2018 | Anderson | F16B 2/10 |

OTHER PUBLICATIONS

Hilti MI/MQ Technical Guide; 5.0 Installation System Hangers; MI/MQ Technical Guide 2015; 1 page.
Hilti MH-SLR-LH Riser clamp; technical data; 4 pages.
Hilti MH-SLR-LS Riser clamp; technical data; 4 pages.
NORMA Group; NORMA Americas; Distribution Services Product Catalog; <www.normaAmericasDS.com>; 53 pages.
NORMA Group; NORMA Americas Distribution Services featuring; R.G.RAY® 853-Series T-Bolt product list; 7 pages.
NVent Caddy; 512 Nvent Caddy EZ Riser for Close Quarters product list; <www erico com/category asp? category=R1395>; 2 pages.
NVent Caddy; 510 Nvent Caddy EZ product list; <www erico com/category asp?category=R345&language=en>; 2 pages.
PHD Manufacturing, Inc. Pipe Clamps Archives product list; <phd-mfg.com/product-category/pipe-hangers-devices/pipe-clamps/>; 12 pages.
R.G.RAY®; V-Clamps Halves; <www.normaAmericasDS.com>; 1 page.

* cited by examiner

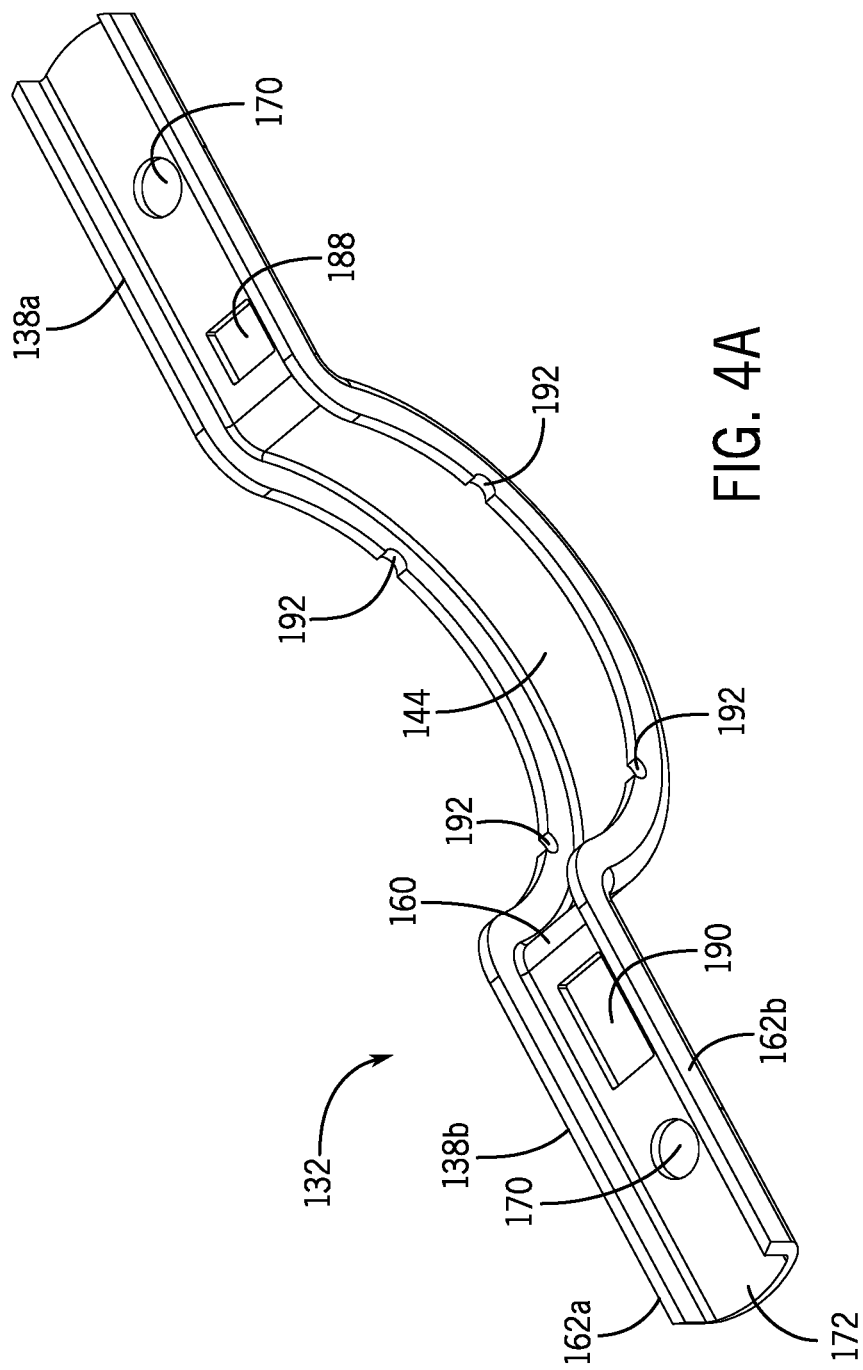

CLAMP FOR CIRCULAR OBJECTS

RELATED APPLICATIONS

This application claims priority to U.S. Provisional Patent Application No. 62/509,505, titled "Clamp for Circular Objects" and filed on May 22, 2017, and U.S. Non-Provisional patent application Ser. No. 15/986,338 titled "Clamp for Circular Objects" and filed on May 22, 2018, the entirety of which is incorporated herein by reference.

BACKGROUND

A clamp can generally be used to support a circular object (for example, when supporting piping vertically within building structures). In some configurations, a clamp can wrap around the circumference of the object, with extension arms providing additional support relative to other structures. For example, a riser clamp that is configured to support a vertically oriented pipe (e.g., a riser pipe) that extends through a hole can secure the pipe within the clamp via a frictional engagement, while the extension arms can engage structure (e.g., floor structure) around the hole to prevent the pipe and the clamp from slipping vertically through a hole.

Some conventional clamps can exhibit multi-piece configurations. For example, two separate clamp members may be configured to be placed together, surrounding a circular object. Once properly placed, the clamp members can be secured together around the object with bolts or other fasteners.

SUMMARY

Embodiments of the invention can provide an improved circular clamp, including a nested clamp configured for ease of installation and for use with higher loads.

In some embodiments, a clamp can be configured to secure a circular object and can include a first clamp member and a second clamp member. The first clamp member can have a first C-shaped cross-sectional profile, and a first clamp portion. The second clamp member can have a second C-shaped cross-sectional profile, and a second clamp portion. The first clamp portion and the second clamp portion can be configured to receive the circular object therebetween, to secure the circular object within the clamp, with the second C-shaped cross-sectional profile nested with the first C-shaped cross-sectional profile.

In some embodiments, a clamp can be configured to secure a circular object and can include a first clamp member and a second clamp member. The first clamp member can have first cross-sectional profile that includes a first base portion and first legs extending from opposing sides of the first base portion. The second clamp member can have a second cross-sectional profile that includes a second base portion and second legs extending from opposing sides of the second base portion. The second clamp member can be configured to removably nest with the first clamp member to secure the circular object, with the first legs disposed one of inside or outside of the second legs so that the first and second clamp member collectively form a box-shaped cross-sectional profile.

In some embodiments, a riser clamp can be configured to secure a pipe and can include a first clamp member and a second clamp member. Each of the first and second clamp members can include, respectively, a clamp portion, a first arm, a second arm, and a cross-sectional profile that extends along the clamp portion, the first arm, and the second arm. The cross-sectional profile can include a base portion and legs extending from opposing sides of the base portion, the first arm including a first elongate slot extending away from the clamp portion, and the second arm including a second elongate slot extending away from the clamp portion.

In an installed configuration of the riser clamp, the first and second clamp members can nest together to secure the pipe, with the legs of the first clamp member disposed one of inside or outside of the legs of the second clamp member, so that the first and second clamp members collectively form a substantially rectangular cross-sectional profile along the first and second arms of the first and second clamp members. The first elongate slot of the second clamp member can extend onto an angled end of the first arm of the second clamp member. The angled end can be configured to nest with the first arm of the first clamp member with the riser clamp in an installation configuration, and to angle away from the first arm of the first clamp member in the installed configuration. The second elongate slot of the second clamp member can open out of an end of the second arm of the second clamp member opposite the clamp portion of the second clamp member.

In some embodiments, a clamp to secure a circular object can include a first clamp member and a second clamp member. The first clamp member can have a first clamp portion and first arms extending from opposing sides of the first clamp portion, with each of the first arms exhibiting a respective first C-shaped cross-sectional profile. The second clamp member can have a second clamp portion and second arms extending from opposing sides of the second clamp portion, with each of the second arms exhibiting a respective second C-shaped cross-sectional profile. The first clamp portion and the second clamp portion can be configured to secure the circular object therebetween, with each of the first arms aligned with a corresponding one of the second arms and with the first C-shaped cross-sectional profile of each of the first arms nested within the second C-shaped cross-sectional profile of the corresponding one of the second arms.

In some embodiments, a clamp to secure a circular object can include a first clamp member and a second clamp member. The first clamp member can have first arms on opposing sides of a first clamp portion, with a first cross-sectional profile that extends onto each of the first arms and includes: a first base portion, and first legs extending perpendicularly from opposing sides of the first base portion. A second clamp member can have second arms on opposing sides of a second clamp portion, with a second cross-sectional profile that extends onto each of the second arms and includes: a second base portion, and second legs extending perpendicularly from opposing sides of the second base portion. Each of the first arms can be configured to align with a corresponding one of the second arms when the circular object is secured by the clamp. The first cross-sectional profile along each of the first arms can be configured to removably nest within the second cross-sectional profile along the corresponding one of the second arms when the first and second clamp portions are secured around the circular object.

In some embodiments, a riser clamp to secure a pipe can include a first clamp member and a second clamp member. Each of the first and second clamp members can include, respectively, a clamp portion, a first arm, a second arm, and a cross-sectional profile that extends along the clamp portion, the first arm, and the second arm. The cross-sectional profile can include a base portion and legs extending from opposing sides of the base portion. In an installed configuration of the riser clamp, the first and second clamp members can nest together to secure the pipe, with the legs of the cross-sectional profile along the first and second arms of the first clamp member being disposed between the legs of the cross-sectional profile along the first and second arms, respectively of the second clamp member, so that the first and second clamp members collectively form rectangular cross-sectional profiles along the first and second arms of the first and second clamp members.

DESCRIPTION OF THE DRAWINGS

FIGS. 4A and 4B are isometric views of clamp members of the clamp system illustrated in FIG. 2;

DETAILED DESCRIPTION

Figure 1B:
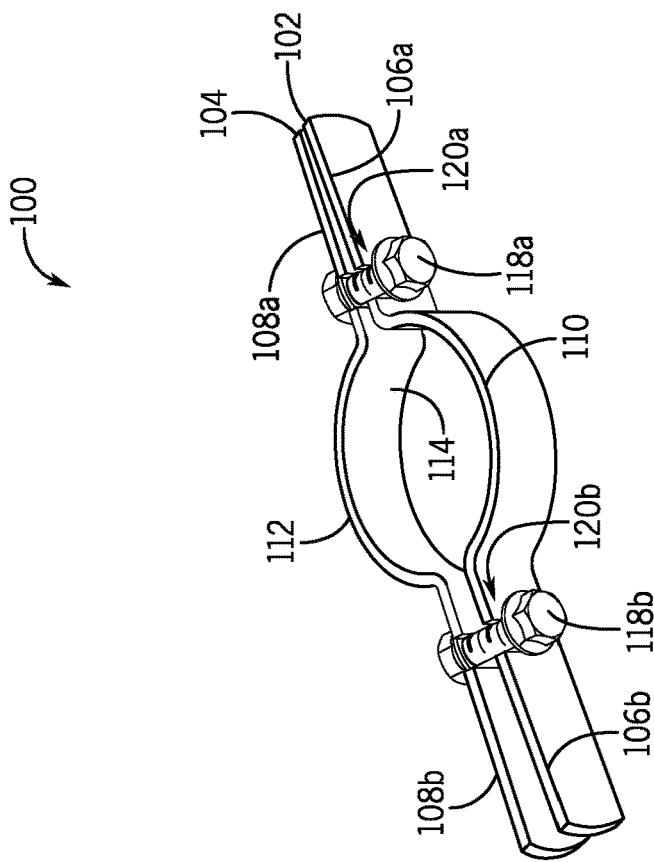
FIG. 1B is a back isometric view of the conventional clamp system of FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "nested" and its derivatives (e.g., "nesting") indicates a configuration in which at least part of one object extends into at least part of another object. For example, a set of two "nested" clamp members can generally be configured so that at least part of one of the clamp members is able to fit together with (e.g., to fit within) at least part of the other clamp member.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As also described above, conventional clamps can be formed with multiple pieces. The clamps are accordingly sometimes sold or shipped as several loose pieces, with the assembly of the pieces occurring during installation. In some cases, conventional clamps can be purchased fully assembled, but can require disassembly and reassembly for installation. Managing this installation process, including management of loose pieces, can sometimes be difficult.

Similarly, conventional clamps can be configured to rely mainly on friction to support an object. In some cases, the forces required to establish sufficient frictional engagement may require relatively large material strength. Accordingly, conventional clamps can sometimes require relatively thick (and heavy) components.

Figure 1A:
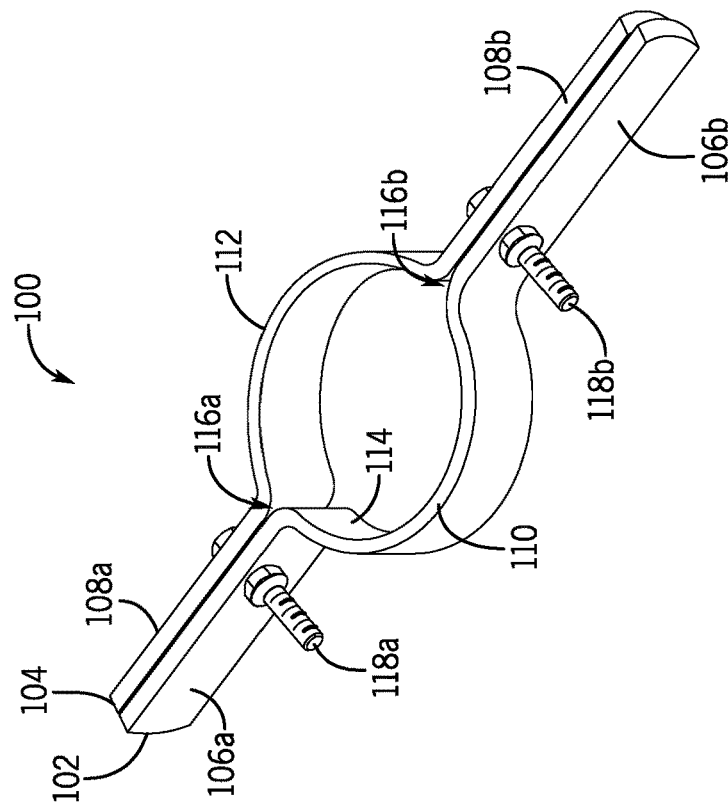
FIG. 1A is a front isometric view of a conventional clamp system.

One example of a conventional pipe clamp 100 with a multi-piece, frictional-engagement configuration is illustrated in FIGS. 1A and 1B. The clamp 100 includes several separate pieces, including a first clamp member 102, a second clamp member 104, and fasteners 118a, 118b.

The first clamp member 102 includes arms 106a, 106b. Disposed between the arms 106a, 106b is a first clamp portion 110. The first clamp portion 110 is arcuate to accommodate a circular object, such as a pipe (not shown in FIGS. 1A and 1B). Generally the arms 106a, 106b can rest on the floor or other surface (not shown) once installed, in order to support a pipe held by the clamp 100 relative to the surface.

The second clamp member 104 similarly includes arms 108a, 108b extending from either side of an arcuate second clamp portion 112. Similar to the arms 106a, 106b of the first clamp member 102, the arms 108a, 108b are configured rest on a floor or other surface once installed.

The first clamp member 102 and the second clamp member 104 are removably coupled with one another via the fasteners 118a, 118b. As also discussed below, the fasteners 118a, 118b can extend through through-holes disposed on the arms 106a, 106b and the arms 108a, 108b to secure the arms 106a, 106b, 108a, 108b together. As illustrated in FIGS. 1A and 1B, the fasteners 118a, 118b can be bolts secured in place by nuts. Accordingly, the bolts of the fasteners 118a, 118b can couple the first clamp member 102 and the second clamp member 104 via the tightening of the corresponding nuts.

Further, the clamp 100 is configured for a flat-surface frictional engagement with a pipe. As illustrated in FIG. 1A, in particular, coupling the first clamp member 102 to the second clamp member 104 creates seams 116a, 116b between the clamp members 102, 104. Other than the seams 116a, 116b, however, the clamp members 102, 104 can provide a substantially continuous interior contact surface 114 to frictionally engage the relevant pipe. With appropriate tightening of the fasteners 118a, 118b, this frictional engagement can prevent the pipe from slipping axially within the clamp 100 under rated loads.

As illustrated in FIG. 1B, in particular, alignment (and attachment) of the first clamp member 102 and the second clamp member 104 can be guided by alignment portions configured as notches 120a, 120b in the arms 108a, 108b, respectively. The notches 120a, 120b are open along the one side of the second clamp member 104, in order to receive fasteners 118a, 118b, during installation of the clamp 100, when the clamp portions 110, 112 are generally aligned. The open-ended configuration of the notches 120a, 120b can usefully allow the clamp member 104 to slide into engagement with the fasteners 118a, 118b, without requiring the nuts to be fully removed. Further, as the fasteners 118a, 118b are tightened, for example, the notches 120a, 120b can incrementally shift the second clamp member 104 into better alignment with the first clamp member 102. However, when the nuts are sufficiently loosened, this open-ended configuration can result in the fasteners 118a, 118b no longer holding the clamp members 102, 104 together.

In this light, although the clamp 100 can be useful in many respects, the use of multiple generally loose pieces design can result in a relatively complicated installation process. For example, a user may need to manage the clamp members 102, 104 as separate loose pieces, including movement of the clamp members 102, 104 into preliminary alignment for the notches 120a, 120b to receive the fastener 118a, 118b. The clamp 100 also generally relies on surface friction along the contact surface 114 to support a clamped object. As also noted above, this can result in a need for relatively strong materials, so that the clamp 100 can be tightened sufficiently around an object to provide appropriately strong frictional engagement.

Embodiments of the invention can provide an improved clamp (e.g., an improved pipe clamp) that can address the issues noted above, or otherwise improve on conventional arrangements. For example, in some embodiments, a clamp according to the invention can be configured with nesting clamp members, which can generally improve ease of installation for operators, as well as generally increasing the structural strength of the clamp for a given material thickness.

In some embodiments, a clamp according to the invention can be configured to be installed without requiring disassembly, thereby reducing (e.g., potentially eliminating) the need for operators to manage multiple loose pieces. In this regard, for example, embodiments of the invention can be installed without the need to remove any individual pieces from a larger assembly (e.g., in contrast to the clamp 100). For example, in some embodiments, a clamp can include hinging features that can allow clamp members to open to receive an object, then close around the object, without requiring disassembly of the clamp or any of its components.

In some embodiments, a clamp according to the invention can be configured to secure an object by at least partly biting into the object, rather than solely by friction. Accordingly, for example, some embodiments of the invention may provide similar load capacities as conventional clamps, while utilizing thinner structures.

Generally, embodiments of the present invention can be formed as clamps to support circular objects (e.g., pipes, bars, and so on). Some of the examples herein, present embodiments of the invention as clamps for pipes, including vertically-installed (e.g., riser) pipes. In some embodiments, clamps according to the invention can be used to secure other objects, including other types of pipes, in a variety of orientations (e.g., horizontally). In some embodiments, clamps according to the invention be used to support non-circular objects.

Figure 2:
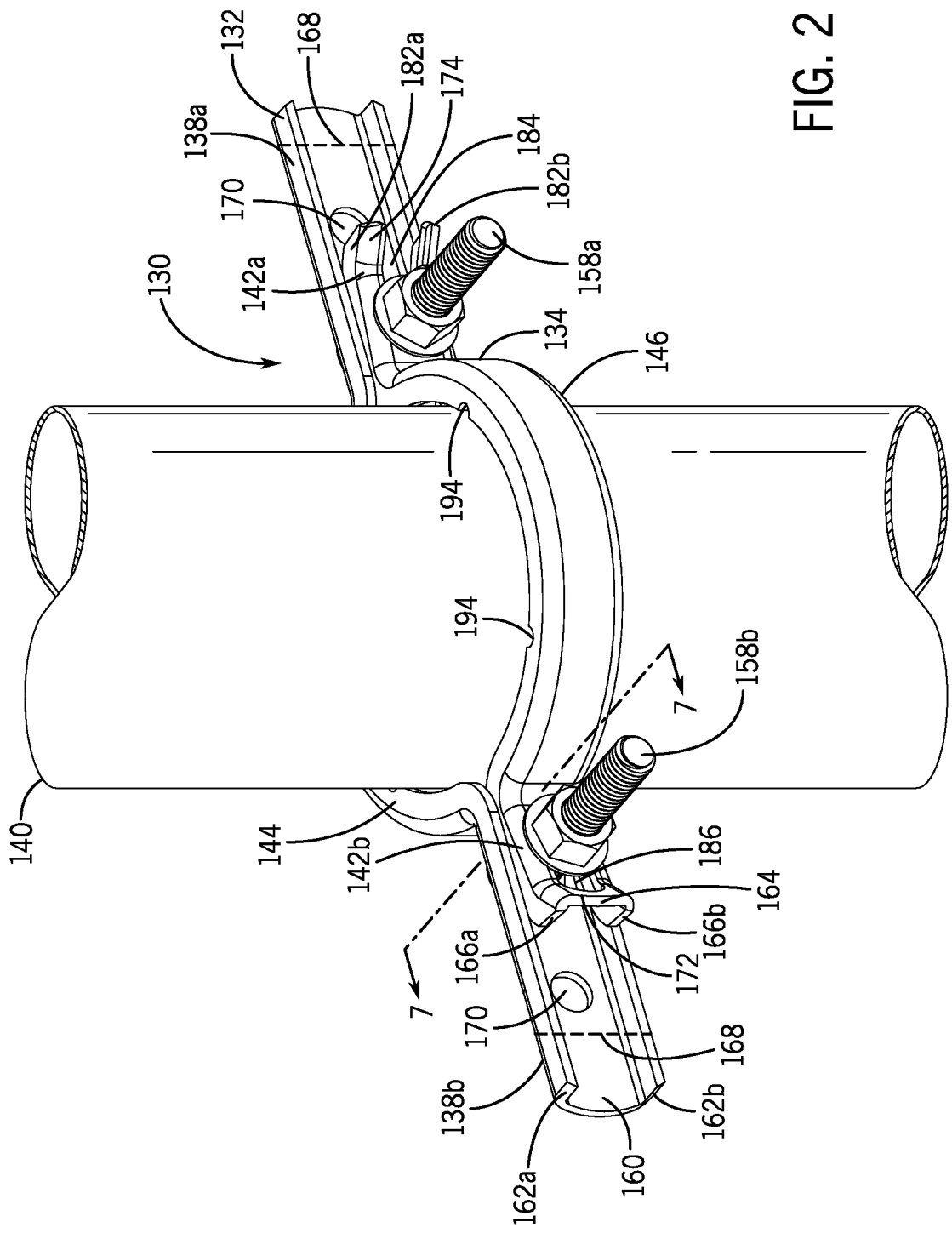
FIG. 2 is a front isometric view of a clamp system in an installed configuration, according to an embodiment of the invention.
Figure 3:
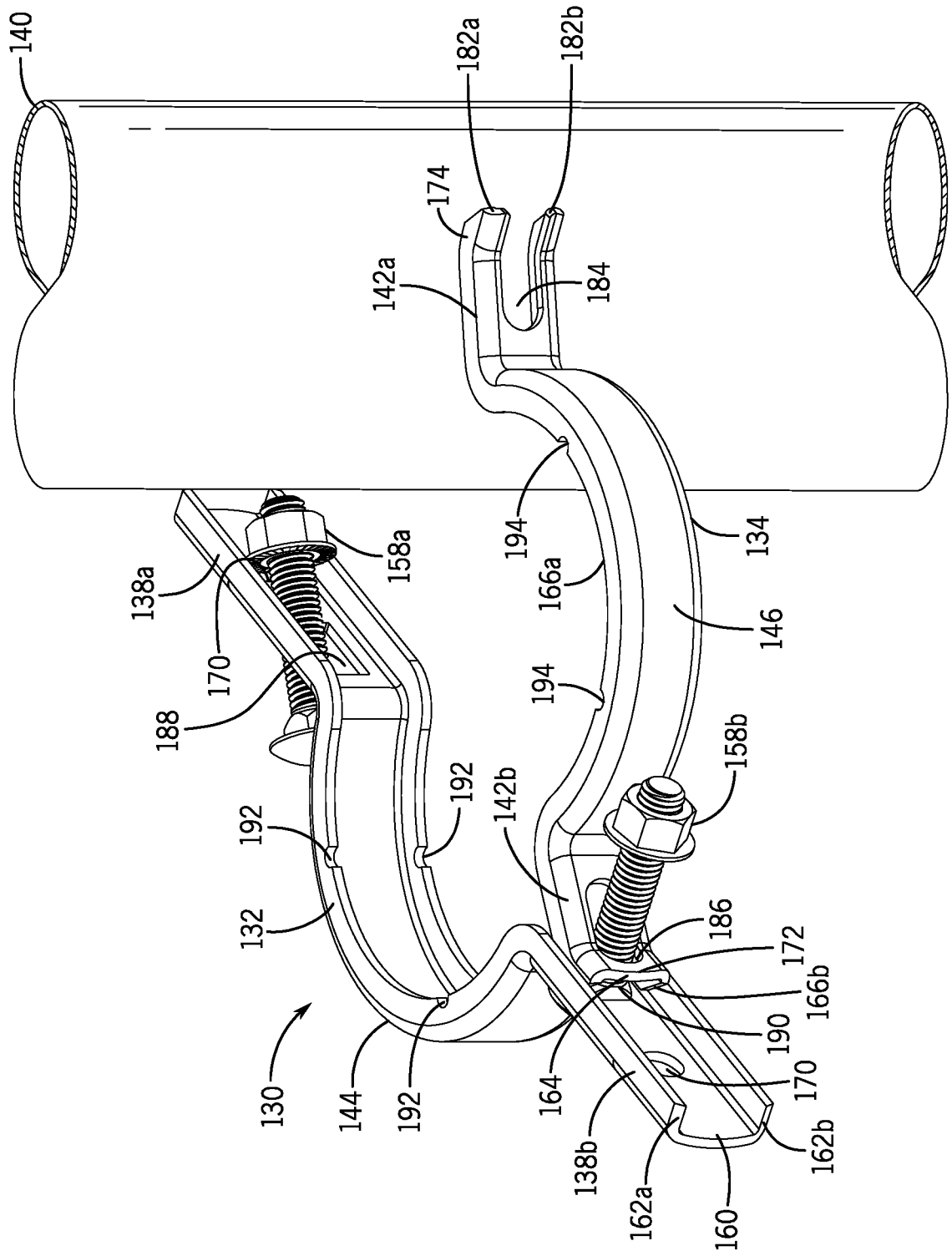
FIG. 3 is a front isometric view of the clamp system illustrated in FIG. 2 in an installation configuration, illustrating part of a method of installation according to an embodiment of the invention.

FIGS. 2 through 7 illustrate an example configuration of a clamp 130, according to one embodiment of the invention. Referring specifically to FIGS. 2 and 3, the clamp 130 includes a first clamp member 132 and a second clamp member 134 that are configured to collectively engage a pipe or other object.

The clamp 130 is generally configured as a riser clamp, although other configurations are possible. Accordingly, for example, arms 138a, 138b extend laterally away from either side of a first clamp portion 144.

As illustrated in FIG. 4A in particular, the arms 138a, 138b and the first clamp portion 144, generally, are formed with a C-shaped cross-section (see also FIGS. 6 and 7), with a first base portion 160 and a first set of opposing legs 162a, 162b that define an open-sided substantially rectangular channel along the full length of the clamp member 132. In other embodiments, other cross-sections are possible, including other generally C-shaped cross-sections.

In the embodiment illustrated, each of the arms 138a, 138b include a through-hole 170. This may be useful, for example, in order to allow the arms 138a, 138b to be attached to other structures.

In some embodiments, arms of opposing clamp members can include apertures configured to receive fasteners to secure the clamp members together around a circular object. In some embodiments, the apertures can be elongate slots in order to allow pivoting movement of the fasteners. As illustrated in FIG. 4A, for example, the arms 138a, 138b include apertures 188, 190, respectively, which are configured to receive fasteners 158a, 158b.

In the embodiment illustrated, the apertures 188, 190 are fully enclosed rectangular slots, with the aperture 188 configured to be generally square in shape and the aperture 188 configured to be an elongated generally rectangular shape. Accordingly, the apertures 188, 190 allow the fasteners 158a, 158b to translate relatively freely along, but not out of, the apertures 188, 190 when the fasteners 158a, 158b are appropriately loosened but not disassembled.

Figure 7:
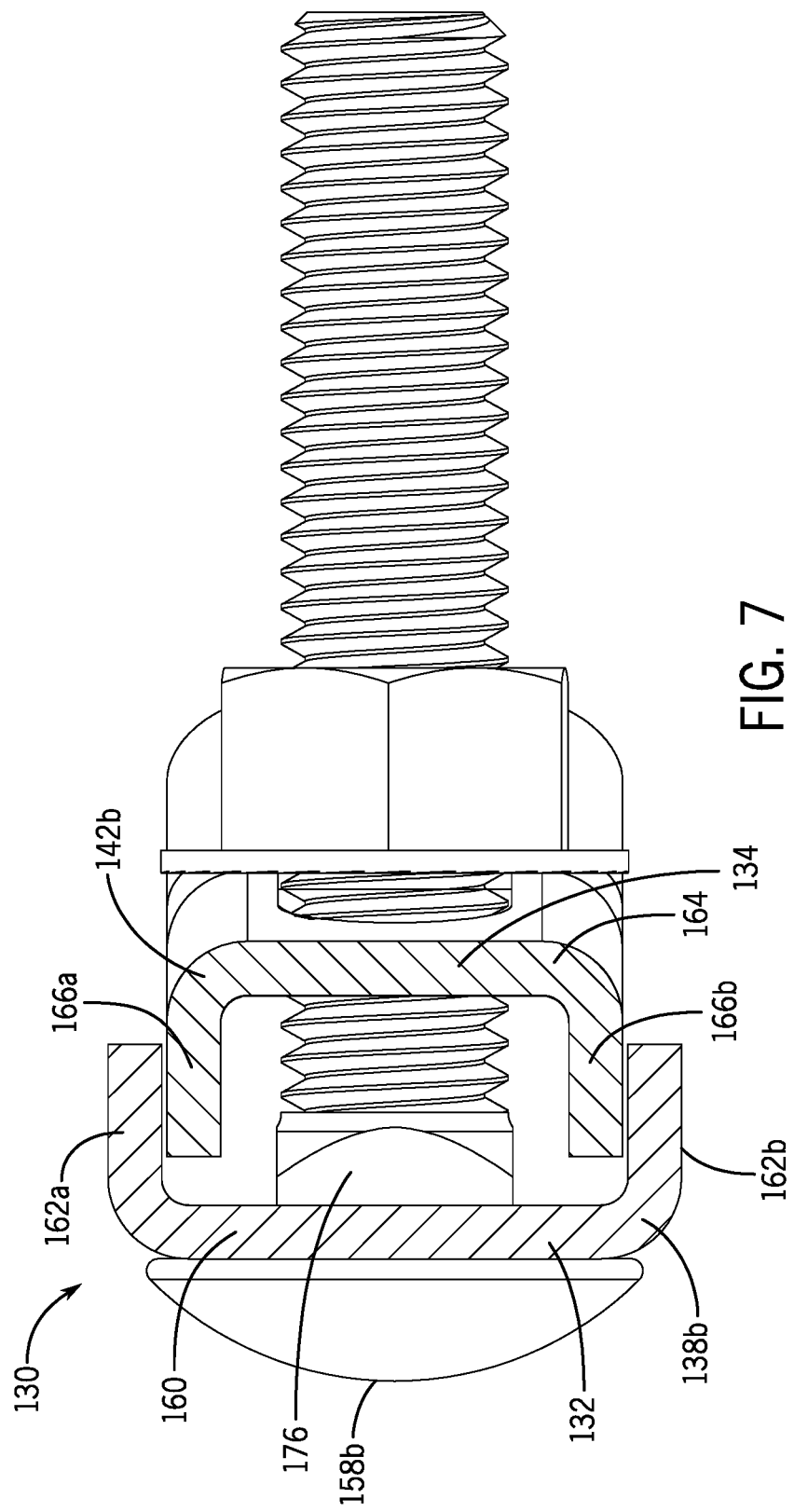
FIG. 7 is a side sectional partial view of the clamp system illustrated in FIG. 2, in the installed configuration, taken along plane 7-7 of FIG. 2

In some embodiments, a width of the apertures 188, 190 in an axial direction (relative to a clamped object) and a length of the aperture 188 in a lateral direction may be approximately the same as the dimension of a square neck of one of the fasteners 158a, 158b (see, e.g., neck 176 in FIG. 7). Accordingly, for example, the shoulder can nest into the relevant aperture 188, 190 when the clamp 130 is fully assembled to further secure the fastener 158a, 158b, and the clamp 130 generally.

In other embodiments, other configurations are possible. For example, in some embodiments, both of the apertures 188, 190 can be elongated shapes. Similarly, in some embodiments, the lateral ends of the apertures 188, 190 can be rounded or otherwise contoured.

As also noted above, the first clamp portion 144 is disposed between the arms 138a, 138b of the clamp member 132. The first clamp portion 144 is generally configured contact an object 140 (e.g., a riser pipe) to secure the object 140 in the clamp 130. In this regard, for example, the first clamp portion 144 can be formed with an inner radius of curvature that generally corresponds to (e.g., matches or is slightly smaller than) an outer diameter of the object 140. In some embodiments, the arcuate length of the first clamp portion 144 may be less than an expected half-circumference of an object to be secured by the clamp 130.

In some embodiments, other features can be included. For example, in the embodiment illustrated, the clamp portion 144 includes a set of drainage holes 192 that extend as half-circle notches into the free edges of the legs 162a, 162b. The drainage holes 192 can be useful, for example, to drain away water that may be sweated by a pipe secured by the clamp 130, in order to reduce the likelihood of rusting.

In some embodiments, as illustrated in FIG. 2 in particular, one or both of the arms 138a, 138b can include a cutting guide 168. In some embodiments, the cutting guide 168 can be used to assist an operator in cutting the clamp 130 to a desired size. For example, in installations where the initial length of the arms 138a, 138b may result in clearance issues, it may be possible to shorten the arms 138a, 138b by cutting the arms 138a, 138b at the guides 168. To facilitate easier shortening of the arms 138a, 138b, for example, the guides 168 can be scored or otherwise marked or weakened. In some embodiments, the cutting guides 168 can facilitate shortening of the arms 138a, 138b by processes other than cutting (e.g., by repeated bending to cause local material failure). In some embodiments, multiple cutting guides (not shown) can be provided on each of the arms 138a, 138b, to facilitate selective shortening of the arms 138a, 138b to one of several lengths.

Figure 4B:
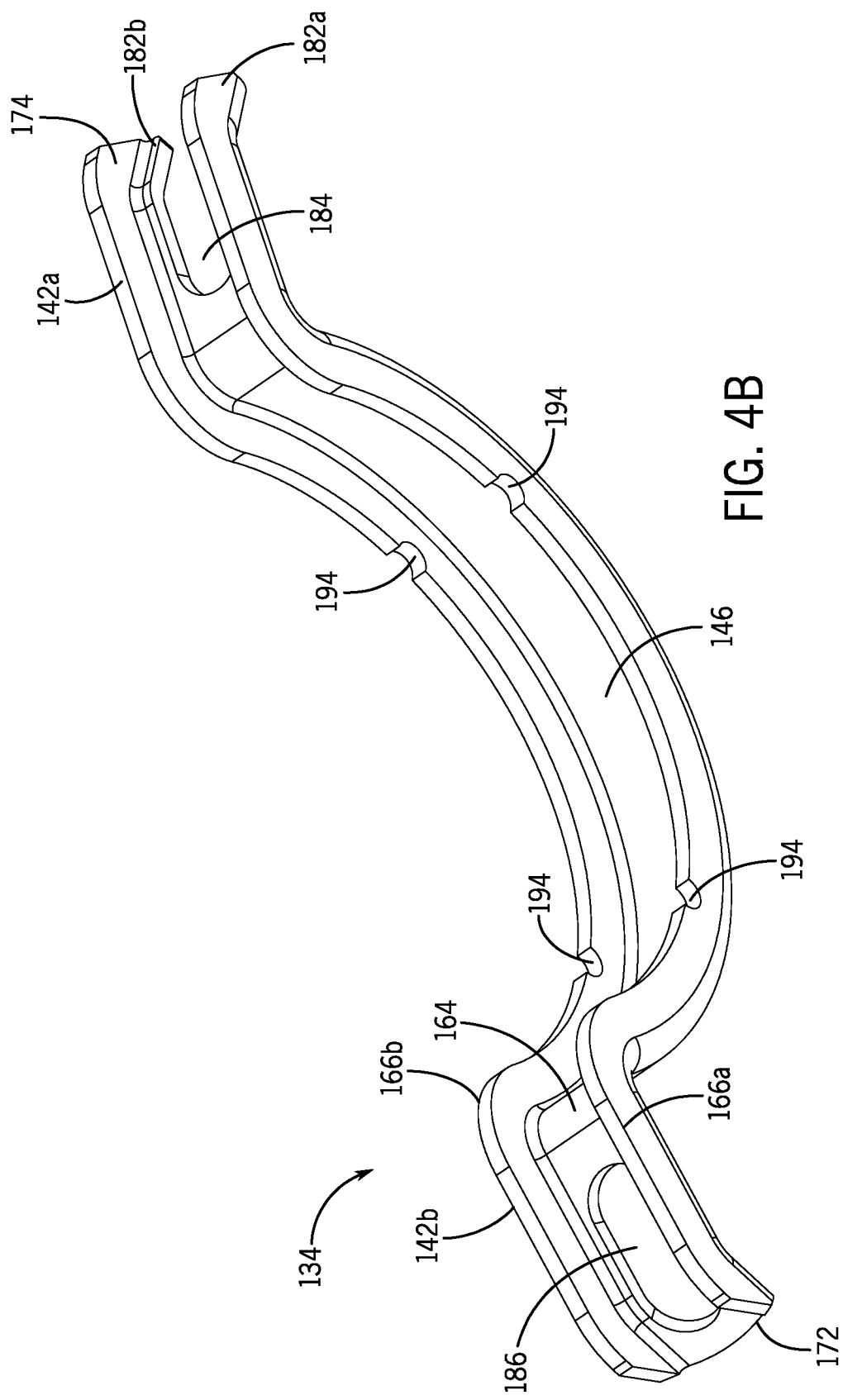

Referring in particular to FIG. 4B, the second clamp member 134 can be generally similar to the clamp member 132. For example, the second clamp member 134 includes arms 142a, 142b extending laterally away from either side of a second clamp portion 146. Like the arms 138a, 138b, the arms 142a, 142b and the second clamp portion 146, generally, are formed with a C-shaped cross-section (see also FIGS. 6 and 7), with a second base portion 164 and a second set of opposing legs 166a, 166b that generally define an open-sided rectangular channel along the full length of the second clamp member 134. As also discussed below, the arms 142a, 142b and the second clamp portion 146 exhibit a smaller cross-section than the arms 138a, 138b and the first clamp portion 144, so that the second clamp member 134 can be nested within the first clamp member 132.

In some embodiments, a clamp member according to the invention can include one or more angled ends that can assist in moving the clamp member between installation and installed configurations or help to retain a fastener in engagement with the clamp member. In the embodiment illustrated, for example, the arm 142b of the clamp member 132 includes an angled end 172, and the arm 142a includes an angled end 174. Generally, the angled ends 172, 174 exhibit the same C-shaped cross-sectional profile as the rest of the arms 142a, 142b, but angle away from a plane defined by the free edges of the legs 166a, 166b along the remainder of the arms 142a, 142b. Accordingly, the angled ends 172, 174 angle away from the clamp member 132 when the clamp 130 is in the installed configuration. As also discussed below, the angled ends 174, 172 can be nested within the arms 138a, 138b, respectively, depending on the relative orientations of the clamp members 132, 134, or can extend outside of the arms 138a, 138b.

As illustrated in FIG. 4B in particular, the arm 142a includes an aperture 184, and the arm 142b includes an aperture 186. Both of the apertures 184, 186 are configured as elongated, generally rectangular slots, with rounded elongate ends, which can allow the fasteners 158a, 158b to translate relatively freely along the apertures 184, 186 when the fasteners 158a, 158b are appropriately loosened.

Like the apertures 188, 190 (see, e.g., FIG. 4A), the aperture 186 is generally configured as a fully enclosed slot. In contrast, the aperture 184 is generally configured as a partially enclosed slot, with an open end coincident with the free end of the arm 142a. Accordingly, for example, the fastener 158a can be pivoted out of the aperture 184 without fully disassembling the nut from the bolt (see, e.g., FIG. 3). In other embodiments, other configurations for the apertures 184, 186 are possible.

As also noted above, the arms 142a, 142b include angled ends 172, 174. In the embodiment illustrated, the apertures 184, 186 extend onto the angled ends 174, 172. Further, the open end of the aperture 184 is generally defined by a first angled portion 182a and a second angled portion 182b of the angled end 174. Usefully, the separated angled portions 182a, 182b can allow the fastener 158a to pivot in and out of the aperture 184 when the fastener 158a is loosened. Further, the angled portions 182a, 182b can collectively serve as a catch to secure the fastener 158a within the aperture 184 when the fastener 158a is appropriately tightened.

As also noted above, the second clamp portion 146 is disposed between the arms 142a, 142b of the second clamp member 134. The second clamp portion 146 is generally configured to contact the object 140 to secure the object 140 in the clamp 130. In this regard, for example, the second clamp portion 146 can be formed with an inner radius of curvature that generally corresponds to (e.g., matches or is slightly smaller than) the outer diameter of the object 140. Thus, for example, as also discussed below, the object 140 can be firmly clamped between the first and second clamp portions 144, 146 (see, e.g., FIG. 2). As similarly noted with regard to the first clamp portion 144, in some embodiments, the arcuate length of the second clamp portion 146 may be less than an expected half-circumference of an object to be secured by the clamp 130.

In some embodiments, other features can be included. For example, in the embodiment illustrated, the clamp portion 146 includes a set of drainage holes 194 that extend as half-circle notches into the free edges of the legs 166a, 166b. The drainage holes 194 can be useful, for example, to drain away water that may be sweated by a pipe secured by the clamp 130, in order to reduce the likelihood of rusting.

As also noted above, in some embodiments, the clamp 130 can be configured as a nesting clamp. This can be useful, for example, in order to help with alignment of the clamp members 132, 134 during installation of the clamp 130 and to improve the strength of the clamp 130 once installed. In some embodiments, as also noted above, the ability to nesting aspect of the clamp 130 can be enabled by size differences between the clamp member 132 and the second clamp member 134. In the embodiment illustrated, for example, the second clamp member 134 exhibits a generally smaller cross-section than the first clamp member 132 (see, e.g., FIG. 7). Accordingly, the second clamp member 134 is configured to nest within the first clamp member 132, with a channel defined by the base portion 160 and the legs 162a, 162b of the clamp member 132 receiving both of the legs 166a, 166b of the clamp member 134. In other embodiments, a reversed configuration is possible.

FIG. 7 illustrates one possible nesting configuration for the clamp 130. In the configuration illustrated, the clamp member 132 and the second clamp member 134 are nested together with the second clamp member 134 nested within the clamp member 132, with the open sides of the respective C-shaped, profiles facing each other, and with the legs 166a, 166b spaced apart from (i.e., not contacting) the base portion 160. The fasteners 158a, 158b (only 158b shown in FIG. 7) can then be tightened, as appropriate, to tighten the clamp member 132 and the second clamp member 134 together. In some situations, this can result in an air gap between the clamp member 132 and the second clamp member 134, as well as a generally box-shaped cross-section of the full assembly.

In the nesting configuration illustrated in FIG. 7, the leg 162a can contact, and can remain substantially parallel to the leg 166a. Similarly, the first leg 162b can contact, and can remain substantially parallel to the second leg 166b. In some embodiments, the first base portion 160 and the second base portion 164 can be substantially parallel to one another. In some embodiments, the first base portion 160 can be substantially perpendicular to the legs 162a, 162b and the second base portion 164 can be substantially perpendicular to the legs 166a, 166b.

As also noted above, in some embodiments, the clamp 130 can generally provide a box-shaped clamp profile. This can be useful, for example, in order to provide relatively high clamp strength during loading. Further, the interaction of the second legs 166a, 166b with the first legs 162a, 162b can generally resist the tendency of the second clamp member 134 to flatten as the fasteners 158a, 158b are tightened. Accordingly, the clamp 130 can generally exhibit significant structural integrity, even under relatively large compressive loading from the fasteners 158a, 158b.

In some embodiments, the first clamp portion 144 and the second clamp portion 146 can contact the object 140 along separate contact areas (e.g., rather than over the single continuous contact area 114, as with the clamp 100 of FIGS. 1A and 1B). In some embodiments, for example, this can reduce or eliminate the reliance on surface friction to support an object, in contrast to conventional clamps.

Figure 5:
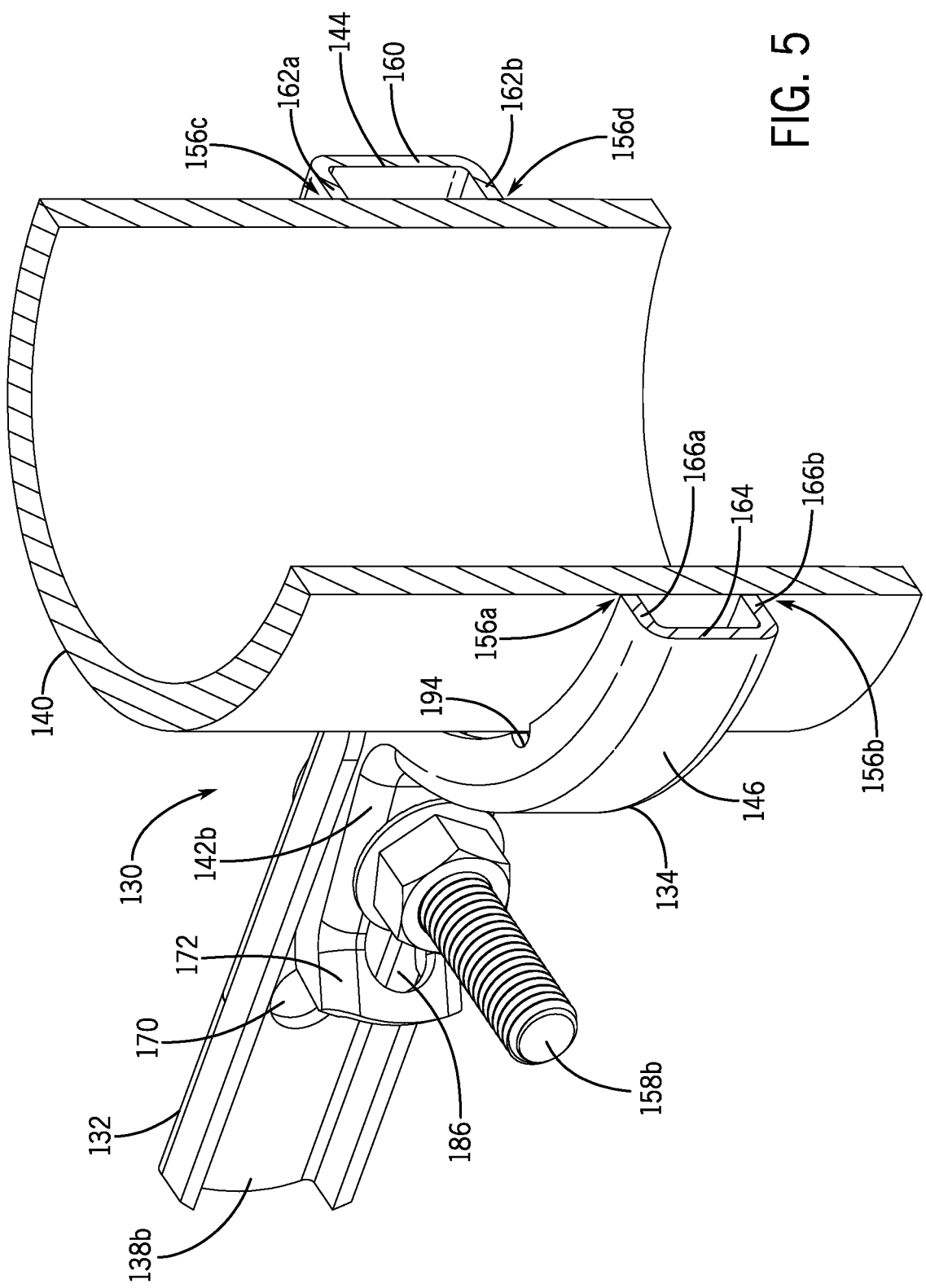
FIG. 5 is a front isometric cross-sectional view of the clamp system illustrated in FIG. 2.
Figure 6:
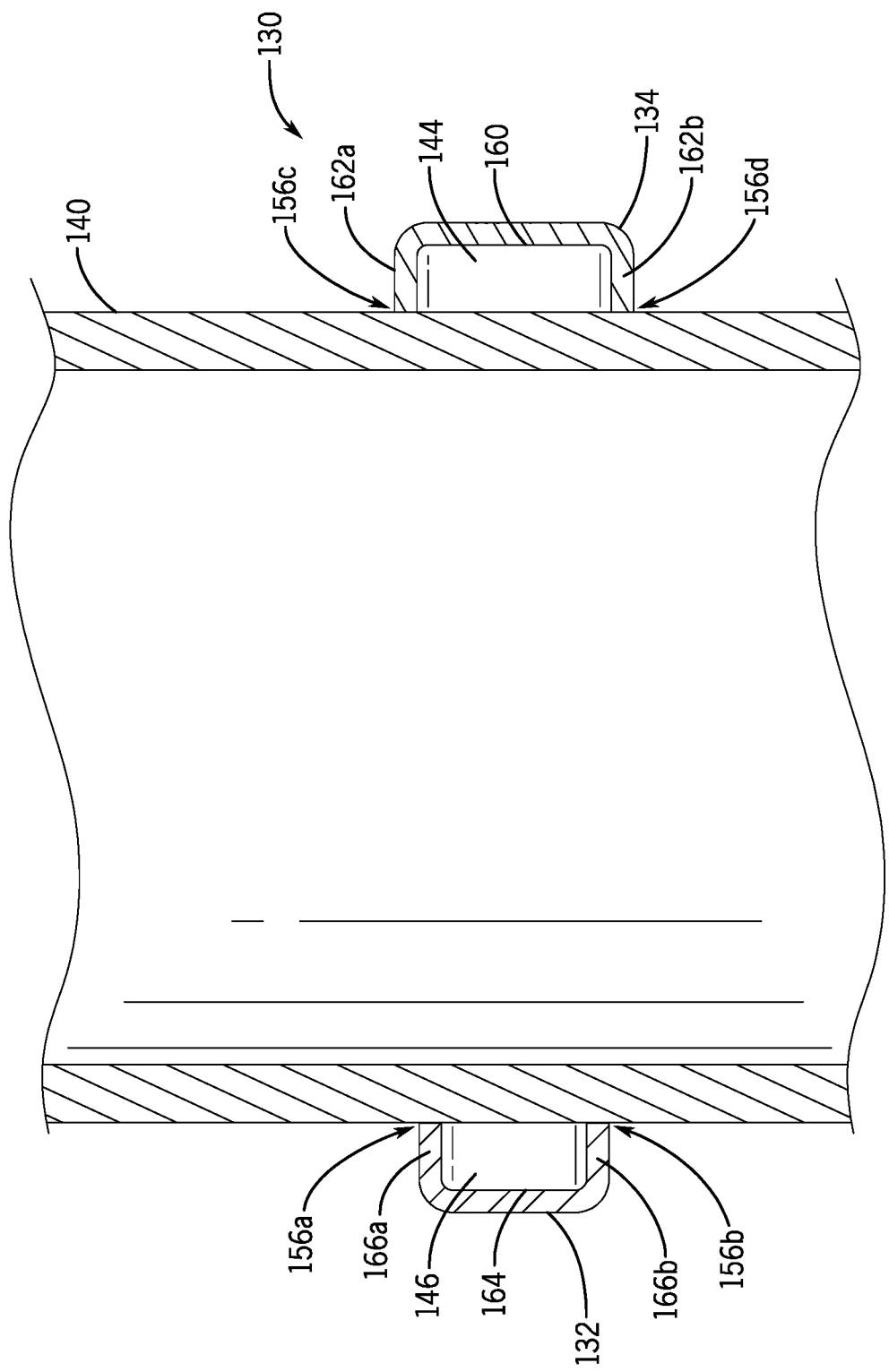
FIG. 6 is a cross-sectional, right side view of the clamp system illustrated in FIG. 2.

FIGS. 5 and 6 in particular, illustrate an example contact configuration provided by the clamp 130. In the embodiment illustrated, a plurality of discrete object contact areas 156a, 156b, 156c, 156d (see FIG. 6), generally corresponding to the edges of the legs 166a, 166b, 162, and 162b, respectively, directly engage the object 140 when the clamp 130 is clamped around the object 140. With sufficient clamping force, for example, this can prevent the object 140 from axial (or other) movement relative to the clamp 130. For example, when the fasteners 158a, 158b are appropriately tightened (see, e.g., FIG. 2), four discrete areas of pressure can occur, along each of the object contact areas 156a, 156b, 156c, 156d, as correspond to the extension of the legs 166a, 166b, 162, and 162b, respectively, along the clamp portions 144, 146. In some situations, it may be beneficial to contact the object 140 at four discrete areas, as illustrated. In other embodiments, a different number of contact areas may be used.

Generally, as the first base portion 160 is compressed towards the object 140 by the fasteners 158a, 158b (see, e.g., FIG. 2), the first legs 162a, 162b can move towards the object 140. Similarly, as the second base portion 164 is compressed towards the object 140 by the fasteners 158a, 158b, the second legs 166a, 166b can also move towards the object 140. As the clamping force on the clamp members 132, 134 is increased, the object contact areas 156a, 156b, 156c, 156d can begin to exert sufficient force on the object 140 to hold the object 140 in place and prevent the object 140 from slipping. With appropriate pressure (e.g., with appropriate tightening of the fasteners 158a, 158b), the first and second clamp portions 144, 146, along the object contact areas 156a, 156b, 156c, 156d provided by the free edges of the legs 162a, 162b, 166a, 166b, can slightly penetrate or compress the material of the object 140 to provide a relatively strong engagement between the clamp 130 and the object 140. Accordingly, the configuration of the clamp 130 to provide the discrete object contact areas 156a, 156b, 156c, 156d can, in some embodiments, reduce (e.g., replace) the need for surface friction to hold objects in place via clamps.

In other embodiments, other configurations are possible. For example, in some embodiments, a clamp according to the invention may include clamp portions that provide a continuous clamping surface (e.g., generally flat cross-section clamp portions), as well as nested clamp arms. Similarly, in some embodiments, padding or other components or configurations can be provided, in order to provide appropriate clamping interfaces for particular installations or uses.

In some embodiments, clamps according to the invention can be configured as hinged clamps, which can swing open or closed without being disassembled. In some embodiments, some parts of a clamp can remain coupled together (and the clamp can remain generally assembled) while other parts of the clamp are uncoupled for relative hinged movement. For example, in some embodiments, two of a clamp's arms can remain coupled together while the other two arms are uncoupled.

In this regard, for example, FIG. 3 illustrates one possible hinging installation configuration for the clamp 130. In the configuration illustrated, the fastener 158b extends through the aperture 190, 186, but has been loosened in order to relatively loosely couple the arm 138b to the arm 142. In this way, for example, as assisted by the elongate configuration of the aperture 190, 186, the arms 138b, 142 can move relative to each other during installation, without being fully disassembled into separate loose components.

In some embodiments, the fastener 158b can be located in a different portion of the aperture 186 during installation than it is after installation is complete. For example, the elongate configuration of the apertures 186, 190 allow the fastener 158b to slide to any number of different orientations. This, in turn, can help to provide a significant range of hinging movement for the clamp 130, including hinging movement not restricted to a fixed axis of rotation.

In some embodiments, an angled end can assist in hinged movement of a clamp. In the embodiment illustrated, for example, the configuration of the angled end 172 and the apertures 190, 186 enable a range of hinging movement of the clamp 130. For example, with the clamp 130 in an open, installation configuration (see, e.g., FIG. 3), the second clamp member 134 can be hinged relative to the clamp member 132, so that the angled end 172 is disposed substantially parallel to, and nested within, the arm 138b. This can be useful, for example, in order to guide the hinging movement of the clamp member 134, while maintaining the clamp members 132, 134 in alignment to be readily hinging closed.

In contrast, when the clamp 130 is in a closed, installed configuration (see, e.g., FIG. 2), the second clamp member 134 is disposed in a rotated orientation (relative to the installation configuration), so that a length of the arm 142 between the angled end 172 and the second clamp portion 146 is disposed substantially parallel to, and nested within, the arm 138b. In this regard, for example, the angled end 172 and the configuration of the apertures 186, 190, can allow the arm 142 to remain nested within the clamp member 132 throughout installation, even as the particular portions of the two clamp members 132, 134 that are nested together change.

Still referring to FIG. 3, the apertures 184, 188 can also help the clamp 130 to hinge open and closed, without being disassembled. For example, as also noted above, the aperture 188 can allow the fastener 158a to be positioned at various locations and angles during installation. Further, due to the open-ended configuration of the aperture 184, a portion of the fastener 158a can be moved into and out of the aperture 184 without disassembling the fastener 158a itself (e.g., removing the nut from the bolt). Accordingly, without disassembling the clamp 130, including the fasteners 158a, 158b, the second clamp member 134 can be pivoted open to receive the object 140, then pivoted to a closed orientation with the arm 142a of the second clamp member 134 nested within the arm 138a of the clamp member 132. The still fully-assembled fastener 158a can then be moved into the aperture 184 via the open end of the aperture 184, and both fasteners 158a, 158b tightened to secure the object 140 in place.

In some embodiments, the fasteners 158a, 158b can loosely couple the clamp member 132 to the second clamp member 134 during installation, thus ensuring proper alignment with one another and the object 140. For example, because the fasteners 158a, 158b need not be disassembled to install the clamp 130, the fasteners 158a, 158b can help operators generally align the clamp members 132, 134 to be nested together.

As also noted above, in some embodiments, the through-holes 170 can be used to secure the clamp 130 to another object. For example, the clamp 130 can be secured to vertically-oriented threaded rods (not shown) via the through-holes 170, so that the clamp 130 can secure the object 140 (or another object) in a horizontal or other orientation (not shown).

Thus, embodiments of the invention can provide can provide an improved clamp for pipes and other objects. For example, embodiments of the invention can be configured to be installed without needing disassembly and reassembly, including of loose hardware. Similarly, in some embodiments, clamps according to the invention can utilize multiple contact areas to secure an object, thereby allowing for the use of thinner (or otherwise reduced-strength) material than in conventional clamps. In this way, for example, embodiments of the invention can support larger loads using relatively less material than conventional clamps.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

Various features of the invention are set forth in the following claims.

The invention claimed is:

1. A clamp to secure a circular object, the clamp comprising:
a first clamp member having a first clamp portion and first arms extending from opposing sides of the first clamp portion, each of the first arms exhibiting a respective first C-shaped cross-sectional profile; and
a second clamp member having a second clamp portion and second arms extending from opposing sides of the second clamp portion, each of the second arms exhibiting a respective second C-shaped cross-sectional profile,
the first clamp portion and the second clamp portion being configured to secure the circular object therebetween, with each of the first arms aligned with a respective one of the second arms and with the first C-shaped cross-sectional profile of each of the first arms nested within the second C-shaped cross-sectional profile of the respective one of the second arms,
wherein each of the first C-shaped cross-sectional profiles include a first base portion and first opposing legs;
wherein each of the second C-shaped cross-sectional profiles includes a second base portion and second opposing legs;
wherein for each of the first arm and the respective second arm, the first opposing legs of the first C-shaped cross-sectional profile are nested within a channel defined between the second opposing legs of the second C-shaped cross-sectional profile;
wherein when the first C-shaped cross-sectional profiles are nested within the second C-shaped cross-sectional profiles, the first and second C-shaped cross-sectional profiles collectively form box-shaped cross sections at the first and second arms.

2. The clamp of claim 1, wherein the first and second clamp members are configured to secure the circular object within the clamp without the first opposing legs contacting the second base portion along either of the second arms and without the second opposing legs contacting the first base portion along either of the first arms.

3. The clamp of claim 1, wherein the first and second C-shaped cross-sectional profiles of the first and second arms extend continuously from the first and second arms, respectively, onto first and second C-shaped cross-sectional profiles that extend along the first and second clamp portions, respectively; and
wherein first opposing legs of the first C-shaped cross-sectional profile that extends along the first clamp portion and the second opposing legs of the second C-shaped cross-sectional profile that extends along the second clamp portion are configured to engage the circular object to secure the circular object within the clamp.

4. The clamp of claim 3, wherein a first width between the first opposing legs of the first C-shaped cross-sectional profile that extends along the first clamp portion is smaller than a second width between the second opposing legs of the second C-shaped cross-sectional profile that extends along the second clamp portion.

5. The clamp of claim 4, wherein the widths between the first opposing legs and between the second opposing legs are constant along the entire length of the first and second clamp portions, respectively.

6. The clamp of claim 1, wherein each of the first arms is configured to be urged towards the respective second arm by tightening a respective fastener, to secure the circular object within the clamp.

7. The clamp of claim 6, wherein the first clamp member is configured to hinge open relative to the second clamp member, while remaining secured to the second clamp member with one of the respective fasteners, to receive the circular object.

8. The clamp of claim 7, wherein, when the first clamp member is hinged open relative to the second clamp member to receive the circular object, the first C-shaped cross-sectional profile of one of the first arms remains nested within the second C-shaped cross-sectional profile of the respective one of the second arms.

9. A clamp to secure a circular object, the clamp comprising:
a first clamp member having first arms on opposing sides of a first clamp portion, with a first cross-sectional profile that extends onto each of the first arms and includes: a first base portion, and first legs extending perpendicularly from opposing sides of the first base portion; and a second clamp member having second arms on opposing sides of a second clamp portion, with a second cross-sectional profile that extends onto each of the second arms and includes: a second base portion, and second legs extending perpendicularly from opposing sides of the second base portion;

each of the first arms being configured to align with a respective one of the second arms when the circular object is secured by the clamp; and the first cross-sectional profile along each of the first arms being configured to removably nest within the second cross-sectional profile along the respective one of the second arms when the first and second clamp portions are secured around the circular object wherein the first clamp member is configured to hinge between:

an installed configuration, in which:

each of the first arms is coupled to the respective one of the second arms with a respective fastener to secure the first and second clamp portions around the circular object; and the first cross-sectional profile is removably nested within the second cross-sectional profile along each the first and second arms on the opposing sides of the first and second clamp portions; and an installation configuration, in which:

one of the first arms and the respective one of the second arms remain coupled together with the respective fastener, with the first cross-sectional profile along the one of the first arms nested within the second cross-sectional profile along the respective one of the second arms; and another of the first arms and the respective one of the second arms are not coupled together with the respective fastener, and are pivoted apart from each other so that the first cross-sectional profile along the other of the first arms is not nested within the second cross-sectional profile along the respective one of the second arms.

10. The clamp of claim 9, wherein, when the first and second clamp portions are secured around the circular object, the first legs of each of the first arms are nested between the second legs of the respective one of the second arms.

11. The clamp of claim 10, wherein, when the first and second clamp portions are secured around the circular object, the first legs of the first cross-sectional profile overlap with the second legs of the second cross-sectional profile so that the first and second arms collectively form box-shaped cross-sectional profiles on the opposing sides of the first and second clamp portions.

12. The clamp of claim 11, wherein the first cross-sectional profile extends uniformly along the first clamp portion and onto the first arms; and wherein the second cross-sectional profile extends uniformly along the second clamp portion and onto the second arms.

13. The clamp of claim 12, wherein the first and second legs are configured to penetrate into the circular object to secure the circular object within the clamp.

14. The clamp of claim 9, wherein, in the installed configuration, the circular object is secured within the clamp without the first legs contacting the second base portion along the second arms and without the second legs contacting the first base portion along the first arms.

15. The clamp of claim 14, wherein the clamp is a riser clamp.

16. A riser clamp to secure a pipe, the riser clamp comprising:

a first clamp member; and a second clamp member;

each of the first and second clamp members including, respectively, a clamp portion, a first arm, a second arm, and a cross-sectional profile that extends along the clamp portion, the first arm, and the second arm, the cross-sectional profile including a base portion and legs extending from opposing sides of the base portion; and in an installed configuration of the riser clamp, the first and second clamp members nesting together to secure the pipe, with the legs of the cross-sectional profile along the first and second arms of the first clamp member being disposed between the legs of the cross-sectional profile along the first and second arms, respectively of the second clamp member, so that the first and second clamp members collectively form rectangular cross-sectional profiles along the first and second arms of the first and second clamp members.

17. The riser clamp of claim 16, wherein, in the installed configuration, the first and second clamp members engage the pipe, along the clamp portions of the first and second clamp members, at free edges of the legs of the respective cross-sectional profile; and wherein, in the installed configuration, the pipe is secured within the riser clamp without the legs of the cross-sectional profile of either of the first and second clamp members contacting the base portion of the cross-sectional profile the other of the first and second clamp members.

* * * * *